C. STREIT.

Extension Lounges.

No. 5,931.

Reissued June 23, 1874.

Witness

Thos. Hunter

William McCouch

Inventor

Charles Streit

By Y. Millward

Attorney

LITHOGRAPHIC Co. N.Y. (OSBORNE'S PROCESS)

UNITED STATES PATENT OFFICE.

CHARLES STREIT, OF CINCINNATI, OHIO.

IMPROVEMENT IN EXTENSION-LOUNGES.

Specification forming part of Letters Patent No. 123,649, dated February 13, 1872; reissue No. 5,931, dated June 23, 1874; application filed March 2, 1874.

*To all whom it may concern:*

Be it known that I, CHARLES STREIT, of the city of Cincinnati, Hamilton county, State of Ohio, have invented a certain new and useful Improvement in Extension-Lounges, of which the following is a specification:

My invention relates to the class of inclined head lounges having an extending part, below which, when the lounge is closed, a back mattress or bed is secreted; and my invention consists in such a construction and combination of stationary frame or lounge-body, an extending-frame, and sinking-frame carrying the back-mattress, that the sinking-frame extends the whole length of the lounge, and is so constructed that when raised it shall occupy the same height as the extended portion, and have the same configuration longitudinally, so as to provide, in connection with the inclined head of the extension part, a bolster for the entire width of the bed.

My invention also further consists of a peculiar device for supporting the sinking-frame when elevated.

Figure 1:
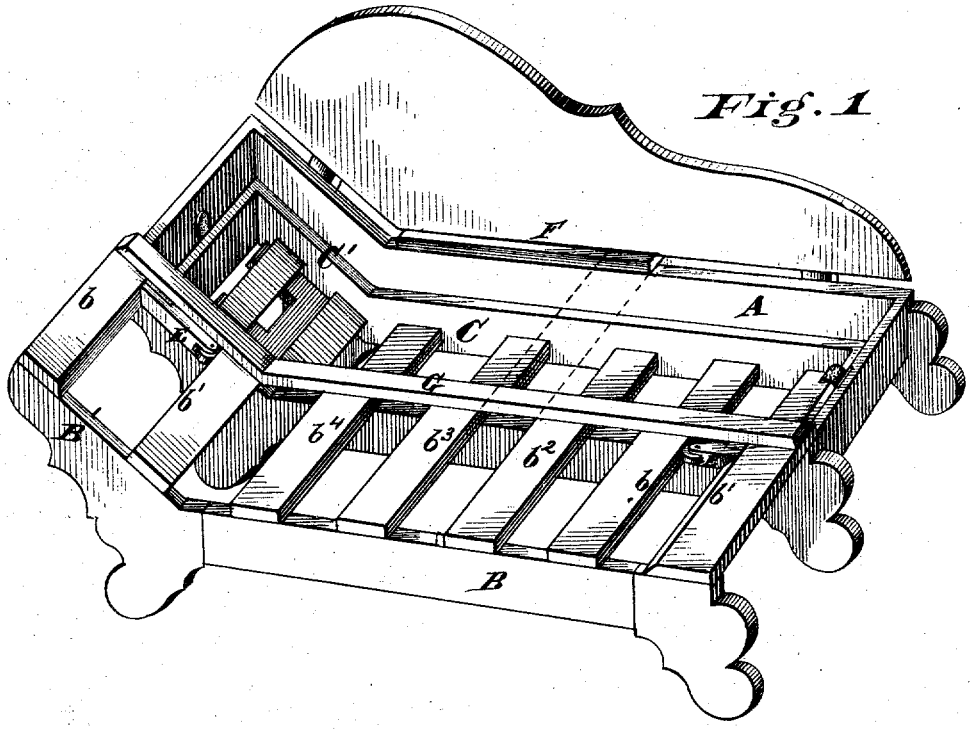
Figure 2:
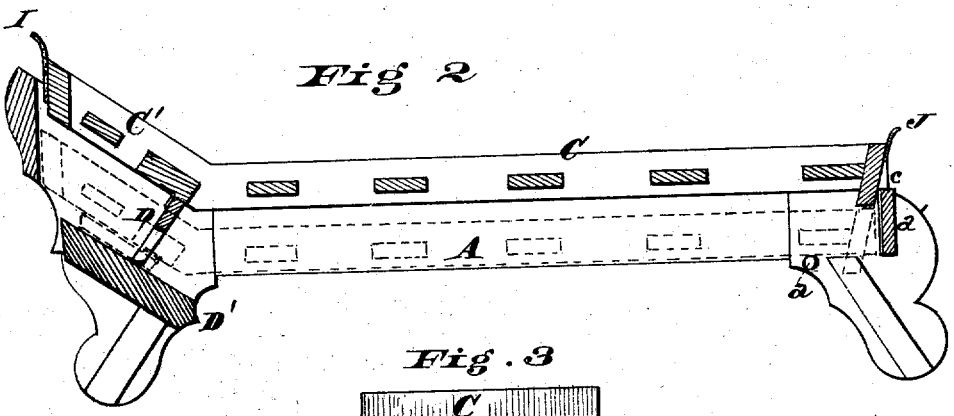
Figure 3:
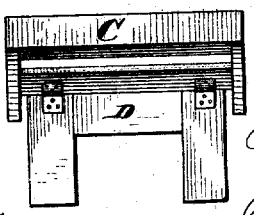

Figure 1 is a perspective view of an extension-lounge embodying my invention. Fig. 2 is a longitudinal section of the same, showing the situation of the sinking-frame when raised, and also (in dotted lines) when sunk. Fig. 3 is an end view of the sinking-frame, together with the brace used to support the same when raised.

A is the stationary part or body of the lounge; and B the extension part, which is moved along the floor in the act of opening the lounge to convert it into a bed. This extension part has, by suitable devices, such as the dovetail blocks and rollers E, secured to the part A, and acting on the dovetail and straight slats $b$ $b'$, a connection with the part A which, although not permitting it to be lifted off the part A, permits it to freely slide out. This connection may be rendered more secure by the swinging bar F, which, when swung out, as shown in dotted lines, slides into the opening between the slats $b^2$ $b^3$, and when thrown in, as shown in Fig. 1, is out of the way of the sinking-frame.

The extension B has the customary inclined bolster-head B′, and is upholstered in the way.

C is the sinking-frame, to be fitted with an upholstered bed or mattress. It occupies the full length of the interior of frame A, and is supported when down upon the brace D′ and studs $a$. When elevated by lifting, it is supported, preferably, on the end rail $a'$, as shown in Fig. 2, and on the swinging prop D, the frame having slight projections $c$ on the ends of its side rails, which project over the end rail $a'$.

The distinguishing feature of the frame C is that it occupies the full length of the interior of the lounge-frame A, and is constructed with an inclined or bolster head, C′, so that when this frame is elevated its mattress or bed not only occupies the same plane horizontally as the surface of the extension B, but its surface matches the surface of B throughout its entire length, its inclined head C′ serving, in connection with the head B′, to provide a bolster-support for the entire width of the bed. The frame C may be lifted by straps I and J.

The slats $b$ $b^1$ $b^2$ $b^3$ $b^4$, upon which the upholstering is done for the permanent seat of the lounge, which constitutes half of the bed when extended, are connected firmly together by the longitudinal strip G extending the entire length of the lounge. This connection not only leaves the space below the slats entirely free, so that nothing projects below them to obstruct the operation of the sinking-frame, but it provides a connection for the upholstering of the lounge.

I claim—

1. The combination of stationary frame A, sliding extension-frame B, having an inclined bolster-head, B′, and sinking-frame C, having an inclined bolster-head, C′, to match B′, for the purpose of forming, when the lounge is extended, a bed having a full-width inclined bolster, substantially as specified.

2. The combination of frame A $a$ $a'$, sinking-frame C $c$, brace D′, and swinging prop D, substantially as specified.

In testimony of which invention I hereunto set my hand.

CHARLES STREIT.

Witnesses:
F. MILLWARD,
R. M. HUNTER.